US011541427B2

(12) United States Patent
Boudjedra et al.

(10) Patent No.: US 11,541,427 B2
(45) Date of Patent: Jan. 3, 2023

(54) METHOD FOR SORTING CORN KERNELS OF A BATCH OF CORN KERNELS

(71) Applicant: LIMAGRAIN EUROPE, Saint Beauzire (FR)

(72) Inventors: Ali Boudjedra, Angers (FR); Serge Dubois, Crach (FR); Guénaël Robic, Roquefort (FR); Régis Brassart, Loire Authion (FR)

(73) Assignee: LIMAGRAIN EUROPE, Saint Beauzire (FR)

( * ) Notice: Subject to any disclaimer, the term of this patent is extended or adjusted under 35 U.S.C. 154(b) by 24 days.

(21) Appl. No.: 16/603,126

(22) PCT Filed: Apr. 6, 2018

(86) PCT No.: PCT/EP2018/058921
§ 371 (c)(1),
(2) Date: Oct. 4, 2019

(87) PCT Pub. No.: WO2018/185320
PCT Pub. Date: Oct. 11, 2018

(65) Prior Publication Data
US 2020/0114395 A1 Apr. 16, 2020

(30) Foreign Application Priority Data

Apr. 7, 2017 (EP) .................................... 17305416

(51) Int. Cl.
*B07C 5/342* (2006.01)
*G01N 21/25* (2006.01)
(Continued)

(52) U.S. Cl.
CPC .............. *B07C 5/3425* (2013.01); *A01C 1/00* (2013.01); *G01N 21/27* (2013.01); *B07C 2501/009* (2013.01); *G01N 2021/8592* (2013.01)

(58) Field of Classification Search
CPC ............ B07C 5/3425; B07C 2501/009; B07C 5/08; B07C 5/10; A01C 1/00; G01N 21/27; G01N 2021/8592
(Continued)

(56) References Cited

U.S. PATENT DOCUMENTS 8,253,054 B2 * 8/2012 Koehler .................. B07C 5/342
 209/576
2004/0141641 A1 * 7/2004 McDonald, Jr. ... G06K 9/00127
 382/159
2011/0202169 A1 8/2011 Koehler

FOREIGN PATENT DOCUMENTS

WO WO 2008/150798 A1 12/2008
WO WO 2012/012411 A2 1/2012

OTHER PUBLICATIONS

International Search Report related to Application No. PCT/EP2018/058921 dated May 18, 2018.
(Continued)

*Primary Examiner* — Michael McCullough
*Assistant Examiner* — Molly K Devine
(74) *Attorney, Agent, or Firm* — von Briesen & Roper, s.c.

(57) ABSTRACT

Method for sorting corn kernels of a batch of corn kernels, the method comprising the steps of:
 laying the corn kernel on a support surface, the corn kernel having a resting surface in contact with the support surface, and an upper surface opposite the resting surface,
(Continued)

acquiring at least one orientation image of the corn kernel with an orientation imaging system, the orientation imaging system having a modality adapted to enable structural features of the corn kernel to be measured, determining an orientation of the corn kernel with respect to the support surface based on the structural features of the corn kernel measured on the orientation image, sorting the corn kernel as a function of the orientation.

13 Claims, 13 Drawing Sheets

(51) Int. Cl.
      *A01C 1/00*       (2006.01)
      *G01N 21/27*       (2006.01)
      *G01N 21/85*       (2006.01)

(58) Field of Classification Search
      USPC .................................................. 209/581, 586
      See application file for complete search history.

(56) References Cited

OTHER PUBLICATIONS

De La Fuente G N et al: "Discrimination of haploid and diploid maize kernels via multispectral imaging". Plant Breeding Wiley USA, vol. 136. No. 1, Feb. 2017 (Feb. 2017), pp. 50-60, XP002772849, ISSN: 0179-9541 cited in the application abstract figures 1-4 challenges and automation; p. 58 p. 59.

* cited by examiner

METHOD FOR SORTING CORN KERNELS OF A BATCH OF CORN KERNELS

CROSS-REFERENCE TO RELATED APPLICATION

This Application is a 35 USC § 371 US National Stage filing of International Application No. PCT/EP2018/058921 filed on Apr. 6, 2018 and claims priority under the Paris Convention to European Patent Application No. 17305416.4 filed on Apr. 7, 2017.

FIELD OF THE DISCLOSURE

The invention relates to a method for sorting corn kernels of a batch of corn kernels.

Although not limited thereto, the invention finds particular applications in sorting corn kernels according to ploidy level of their respective embryos.

BACKGROUND OF THE DISCLOSURE

The establishment of homozygous lines is a fundamental practice in selection and breeding. One of the major strains in the establishment of homozygous lines is the long time (usually 8-10 generations) needed for obtaining individuals with a high level of homozygosis.

Doubled haploids represent a major breeding tool (Geiger et al., Doubled haploids in hybrid maize breedings, Maydica, 54(4):485-499, 2009 and Rober et al., In vivo haploid induction in maize—Performance of new inducers and significance of doubled haploid lines in hybrid breeding, Maydica, 50(3-4): 275-283, 2005). It allows rapid production of a homozygous line in fewer generations than traditional methods. It can be used to benefit of a maximum genetic variance in breeding programs and to accelerate the stacking of genes in a recurrent line.

Spontaneous haploids can be observed on all the cross but lines with a specific ability to induce haploids have been identified by Coe 1959, with the line Stock 6. A lot of derived lines issued from this ancestral line have an improved inducer efficiency: WS14 Lashermes 1988, RWS Rober 2005, RWS x RWK-76 (Geiger 2009), PK6 (WO 2005/004586), etc.

It is common to obtain 10 to 12% of haploids progeny with a some inducer lines. Haploid kernels are not significantly different from diploids. One of the major difficulties for breeder is therefore to identify haploid from diploid kernels. In the double fecundation of angiosperm, the pollen contains two nuclei. In the fecundation process, the fecundation of the haploid oosphere (n) by one nucleus (n) leads to a diploid embryo and the fecundation of the polar nucleus (2n) by the second nucleus leads to the 3n endosperm. By "haploid kernel", in the contest of the invention, it is understood a kernel with a haploid embryo. By "diploid kernel", it is understood kernel with a diploid embryo whatever the ploidy level of the endosperm.

Anthocyanin color marker has been quickly introduced into inducer line to identify haploid seeds (Nanda et Chase 1966, Greenblatt and Block 1967, Chase 1969). The dominant marker gene R1-nj that can cause a dark coloration on the embryo or the endosperm (Chaikam V. and Prasanna B M, Doubled haploid Technology in maize breeding: theory and practice, CIMMYT, 2012).

When the R1-nj marker is used, kernel issuing from the cross of a start and the inducer line can be sorted in three classes:

dark embryo and dark endosperm are kernels from the cross between the plant (line, F1 etc. . . . ) and the inducer with a diploid embryo ("diploid kernel") and a triploid endosperm, clear embryo and dark endosperm are kernels from the cross between the plant and the inducer with a haploid embryo, not colored ("haploid kernel"), and a triploid endosperm clear kernels or "yellow kernels", classified as "diploids kernels" are not issuing from the crossing with the inducer line, they may be self-pollinated or contaminants with more probably a diploid embryo and a triploid endosperm.

Other traits have been associated with the Ig-induced androgenetic haploid production line in document EP 0 636 310 to facilitate the recovery of haploid plants. More recently, other markers have been used as the oil content of the kernels seeds (Rotarenco 2007, Li 2009). These markers allow the recovering of kernel under NIRS or RMN analysis as described especially in document WO 2014/151183. Document WO 2016/044050 also describes the use of a kernel sorter based on the identification of oil content by RMN located on the harvester and potentially associated to a seed chipping and genotyping system.

Transgenic inducers with an embryo lethal gene controlled by embryo specific promoters have also been proposed in documents U.S. Pat. Nos. 8,269,061 and 9,121,032. However, these transgenic approaches are costly and difficult to implement due to the regulation of transgenic material. Another transgenic solution described is the use of an RWS-GFP line Yu and al., 2016 Mol Breeding.

Weighing of the kernels to sort haploid kernel on their average lower weight has been tested by Smelser and al., 2015, this method allows enrichment of haploid kernel but is limited on certain genotypes.

Other devices for sorting kernels are described in documents WO 2005/031367, WO 2008/150903, U.S. Pat. Nos. 8,253,054, 5,703,784 and 4,975,863.

The use of image analysis to orient kernel is described in WO 2008/150798 or US 2008/0317279, in this system a first step of orientation of the kernel is obtained by vacuum applied to a boarder side of the kernel so the kernel is in a 360° plane position. The image allows detecting the tip orientation of a kernel, and the kernel can further be oriented by rotation.

In US 2007/0207485, seed are singularized by passing through a transfer tube wherein only tip-down or tip-up orientation of the kernel is possible, an imaging device can detect the orientation of the kernel in this tube.

No imaging system can provide the kernel orientation without a primary step of mechanical orientation of the kernel, and notably embryo position cannot be identified.

Discrimination of haploid and diploid kernels by multi-spectral imaging has been evaluated by De La Fuente et al., 2017, their experiments were done on oriented kernels and they explain that the challenge in automatization of the process is to display kernel in consistent and accurate position.

Document U.S. Pat. No. 8,965,101 discloses a kernel sorter in which haploid and diploid kernels are sorted from analyses of multispectral images of a resting surface of the kernel. However, misclassified kernels are still numerous and this device cannot offer a high rate of sorting.

Document U.S. Pat. No. 9,156,064, also describes a kernel sorter, moreover seed lots in this system comprises generally flat kernels and this system do t does, not, disclose how to determine kernel position and embryo position on a kernel whatever the shape of the kernel is and also leads to a high rate of misclassified kernel.

Therefore, there still exists a need for a method enabling kernels to be sorted, especially but not only about the haploid or diploid nature of their embryo, with a high throughput. Such need is further expressed for flint variety of kernels which have a round shape.

SUMMARY OF THE DISCLOSURE

The invention aims at fulfilling such need.

To this end, the invention provides a method for sorting corn kernels of a batch of corn kernels, the method comprising the steps of:

laying the corn kernel on a support surface, the corn kernel having a resting surface in contact with the support surface, and an upper surface opposite the resting surface, acquiring at least one orientation image of the corn kernel with an orientation imaging system, the orientation imaging system having a modality adapted to enable structural features of the corn kernel to be measured, determining an orientation of the corn kernel with respect to the support surface based on the structural features of the corn kernel measured on the orientation image, sorting the corn kernel as a function of an orientation of the corn kernel.

Hence, the orientation of the corn kernel, which may be defined by an arrangement of at least one of the longitudinal axis, the tip, the top, the embryo area, the pericarp and the pericarp top area of the corn kernel with respect to the support surface, can be determined at first making possible to know whether it will be possible to identify features according to which the corn kernels should be sorted and, if so, with which accuracy. If it is determined that the orientation of the corn kernel will not enable the search features to be identified, it is possible to prevent subsequent steps of the processing to be performed on this corn kernel. If it is determined that the orientation of the corn kernel enables the search features to be identified, the subsequent steps can be performed with a better accuracy. The orientation imaging system in this method can be used by a two-step method: acquiring raw data construct a 3D image or 3D profile from the raw data and measure the structural feature on this 3D image, this 3D image is the orientation image as used in the invention. But the raw data can also be used directly to obtain the structural features and in this context these "raw data" can be intended as orientation image.

The orientation imaging system may be configured to acquire a three-dimension orientation image of the corn kernel. During the step of acquiring at least one orientation image of the corn kernel, at least one three-dimension orientation image of the corn kernel may be acquired.

The orientation imaging system may comprise at least one laser device arranged to lighten the corn kernel with a laser line, and a plurality of orientation imaging devices configured to acquire respective two-dimension orientation images of the corn kernel along different viewing directions. During the step of acquiring at least one orientation image of the corn kernel, the corn kernel may be lightened with the laser line and two-dimension orientation images of the corn kernel along different viewing directions may be acquired. During the step of determining an orientation of the corn kernel, the orientation of the corn kernel with respect to the support surface may then be determined based on the structural features of the corn kernel measured on each of the two-dimension orientation images.

The orientation imaging system may be arranged above the support surface. During the step of acquiring at least one orientation image of the corn kernel, the orientation image of the upper surface of the corn kernel is acquired.

During the step of determining an orientation of the corn kernel, it may be determined whether the resting surface of the corn kernel includes the embryo area. During the step of sorting the corn kernel, if the resting surface of the corn kernel includes the embryo area, the corn kernel may be sorted as being in a back position with a back surface opposite the embryo area up, and if the resting surface of the corn kernel includes the back surface of the corn kernel, the corn kernel may be sorted as being in an embryo position with the embryo area up.

During the step of determining an orientation of the corn kernel, before determining whether the resting surface of the corn kernel includes the embryo area, it may be determined whether the resting surface of the corn kernel is substantially parallel to the longitudinal axis. If the resting surface of the corn kernel is substantially parallel to the longitudinal axis, the corn kernel may be sorted as being in a position laying flat and it may be determined whether the resting surface of the corn kernel includes the embryo area. If the resting surface of the corn kernel is not substantially parallel to the longitudinal axis, the corn kernel may be sorted as being in a position non laying flat and it may be determined whether the resting surface includes the pericarp top area. If the resting surface includes the pericarp top area, the corn kernel may be sorted as being in a tip position with the tip up. If the resting surface does not include the pericarp top area, an inclination of the longitudinal axis of the corn kernel with respect to the support surface may be measured. If the inclination is less than 50°, the corn kernel may be sorted as being in an inclined centered embryo position.

The step of identification of the kernel orientation may be followed by identification of differences between structural features of the embryo and structural features of the endosperm and sorting of the kernel according to said differences.

After the step of sorting the corn kernel as a function of the orientation, the method may further comprise the steps of:

acquiring at least one image of the corn kernel with a coloration imaging system, the coloration imaging system having a modality adapted to enable coloration to be distinguished on the image, determining the coloration intensity of at least one of the embryo area and the non-embryo area on the acquired image, and sorting the corn kernel as a function of the coloration.

The knowledge of the orientation of the kernel may also be used for other application in kernel sorting. Sorting seed on endosperm colour for all the seed on back position, on embryo size for the seeds on embryo position but also on tip characteristics for kernels on tip position. This analysis is not limited to colour intensity, texture, waxy, furrowed, vitreous endosperm can also be identified by this device. Other physical measurements on the kernel may be done following this sorting, these measurements being more accurate by the fact that all kernels may be on a similar orientation.

The described method also allows identification of the position of the embryo on the kernel and can allow specific identification of this embryo, for example, it is known that the embryo size is relative to is ploidy level (Chang 2009), a sorting of the kernels on relative embryo size can extend the rate of haploid kernel in a population of seeds. Haploid embryos can also be characterized by a less regular shape this element can also be used for kernel sorting alone or combined with coloration sorting.

One can also imagine that the orientation imaging system and coloration imaging system or physical measurement are done simultaneously.

The method may be especially adapted for sorting corn kernels according to ploidy level of the respective embryos, the corn kernels having a marker causing:

the embryo area having a dark coloration and the pericarp top area having a dark coloration for "diploid corn kernels", the embryo area having a bright coloration, namely an absence of dark coloration, and the pericarp top area having a dark coloration for "haploid corn kernels", and embryo area and pericarp top area having a bright coloration for "yellow kernel".

The step of determining the coloration intensity may comprise determining the coloration between bright coloration and dark coloration of at least one of the embryo area and the pericarp top area on the acquired image.

The invention may then provide an automated method for sorting haploid and diploid corn kernels with a high throughput. The knowledge of the orientation of the corn kernel enable a proper identification of the embryo and in fine of its coloration as well as that of the endosperm.

The coloration imaging system may include a plurality of coloration imaging devices configured to acquire respective coloration images of the corn kernel along different acquiring directions. During the step of acquiring at least one coloration image of the corn kernel, at least one of the coloration imaging devices may be selected in accordance with the orientation of the corn kernel.

Images acquired by the coloration imaging system may be colour (RGB images) or grey images. In the context of the invention "coloration image" can be any multispectral image. The interpretation of these multispectral image can allow identification of other kernel defect or kernel trait as, kernel cracking, germination potential, disease symptoms, presence of a pathogen, presence of mycotoxins . . . .

The plurality of coloration imaging devices may comprise at least one top coloration imaging device arranged to face the support surface, and at least one bottom coloration imaging device arranged below the support surface. During the step of acquiring at least one coloration image of the corn kernel, said at least one coloration image may be chosen between a coloration image of the upper surface of the corn kernel acquired by the top coloration imaging device and a coloration image of the resting surface of the corn kernel acquired by the bottom coloration imaging device.

Each of the corn kernels may be conveyed on the support surface along a path in a conveying direction and dropped at an end of the path. The top and bottom coloration imaging devices may be arranged respectively upstream and downstream with respect to the conveying direction, the bottom coloration imaging device being arranged to acquire said at least one coloration image as the corn seed is dropped.

During the step of acquiring at least one coloration image of the corn kernel, at least one coloration image may be acquired by the top coloration imaging device if the corn kernel is in one of the embryo position, the tip position and the inclined centered embryo position, and at least one coloration image may be acquired by the bottom coloration imaging device if the corn kernel is in the back position.

The coloration imaging system may comprise at least one pair of lightening and imaging assemblies, each lightening and imaging assembly comprising a multispectral camera arranged to acquire a coloration image of the corn kernel at a wavelength and a lightening device configured to lighten the corn kernel at the wavelength. During the step of acquiring at least one coloration image of the corn kernel, one of the lightening and imaging assemblies may lighten the corn kernel and acquire a coloration image of the corn kernel at a wavelength $\lambda 1$ comprised between 550 nm and 700 nm, preferably between 600 nm and 650 nm, and the other lightening and imaging assembly may lighten the corn kernel and acquire a coloration image of the corn kernel at a wavelength $\lambda 2$ comprised between 700 nm and 850 nm, preferably between 720 nm and 780 nm.

The coloration imaging system may comprise a plurality of pairs of lightening and imaging assemblies distributed around the corn kernel. During the step of acquiring at least one coloration image of the corn kernel, at least one of the pairs of lightening and imaging assemblies may be selected.

The coloration imaging system may comprise at least one laser device arranged to lighten the corn kernel with a laser line, and at least one scatter camera arranged to acquire a scatter coloration image of the corn kernel. During the step of acquiring at least one coloration image of the corn kernel, the corn kernel may be lightened with the laser line and at least one scatter coloration image of the corn kernel may be acquired.

A station for implementing the method as previously defined. The device may comprise:

at least one orientation image of the corn kernel with an orientation imaging system, the orientation imaging system having a modality adapted to enable structural features of the corn kernel to be measured, and a central unit configured to determine an orientation of the corn kernel with respect to the support surface based on the structural features of the corn kernel measured on the orientation image, and to sort the corn kernel as a function of the orientation.

The station may further comprise a coloration imaging system, the coloration imaging system having a modality adapted to enable coloration to be distinguished on the image. The central unit may be configured to determine the coloration intensity of at least one of the embryo area and the non-embryo area on the acquired image, and to sort the corn kernel as a function of the coloration.

BRIEF DESCRIPTION OF THE DRAWINGS

Other objects and advantages of the invention will emerge from the following disclosure of a particular embodiment of the invention given as non limitative example, the disclosure being made in reference to the enclosed drawings in which.

DETAILED DESCRIPTION OF THE DISCLOSURE

On the Figures, the same reference numbers refer to the same or similar elements.

Figure 1:
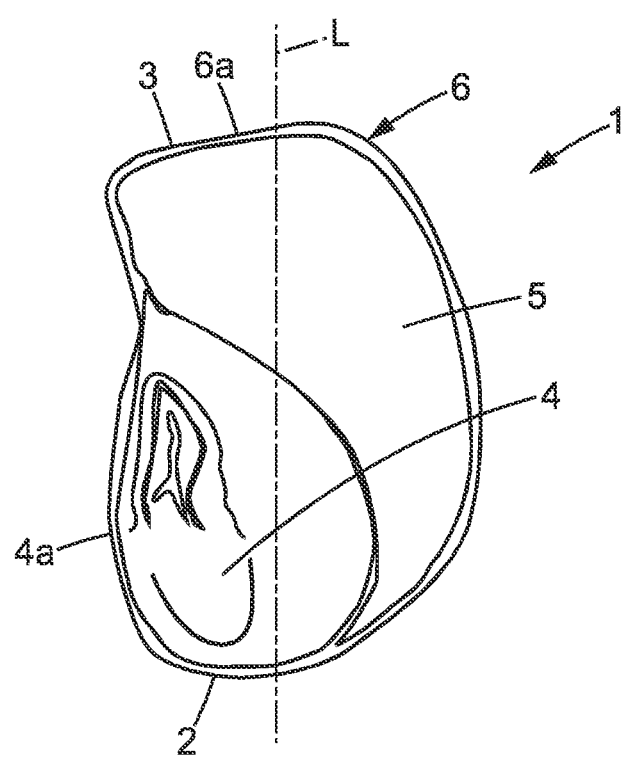
FIG. 1 is a schematic view of a corn kernel.

FIG. 1 represents a corn kernel 1. The corn kernel 1 globally extends along a longitudinal axis L between a tip 2, with which it is attached to a cob, and a top 3 opposite the tip 2. The corn kernel 1 has an outer surface housing an embryo 4 and an endosperm 5. The outer surface includes an embryo area 4a in the vicinity of the embryo 4, and a pericarp 6 enveloping the embryo and the endosperm 4 and 5. The pericarp 6 has a pericarp top area 6a at the vicinity of the top 3.

In the context of haploid vs. diploid sorting, corn kernels 1 have a marker causing:

the embryo 4, and therefore the embryo area 4a, having a dark coloration and the endosperm 5, and therefore the pericarp top area 6a, having a dark coloration for "diploid corn kernels" 1, the embryo 4, and therefore the embryo area 4a, having a no coloration, also defined as a bright coloration by contrast with the dark coloration, and the pericarp top area 6a having a dark coloration for "haploid corn kernels" 1, and the pericarp with no coloration or bright coloration for "yellow corn kernels" (haploids or diploids).

Figure 2:
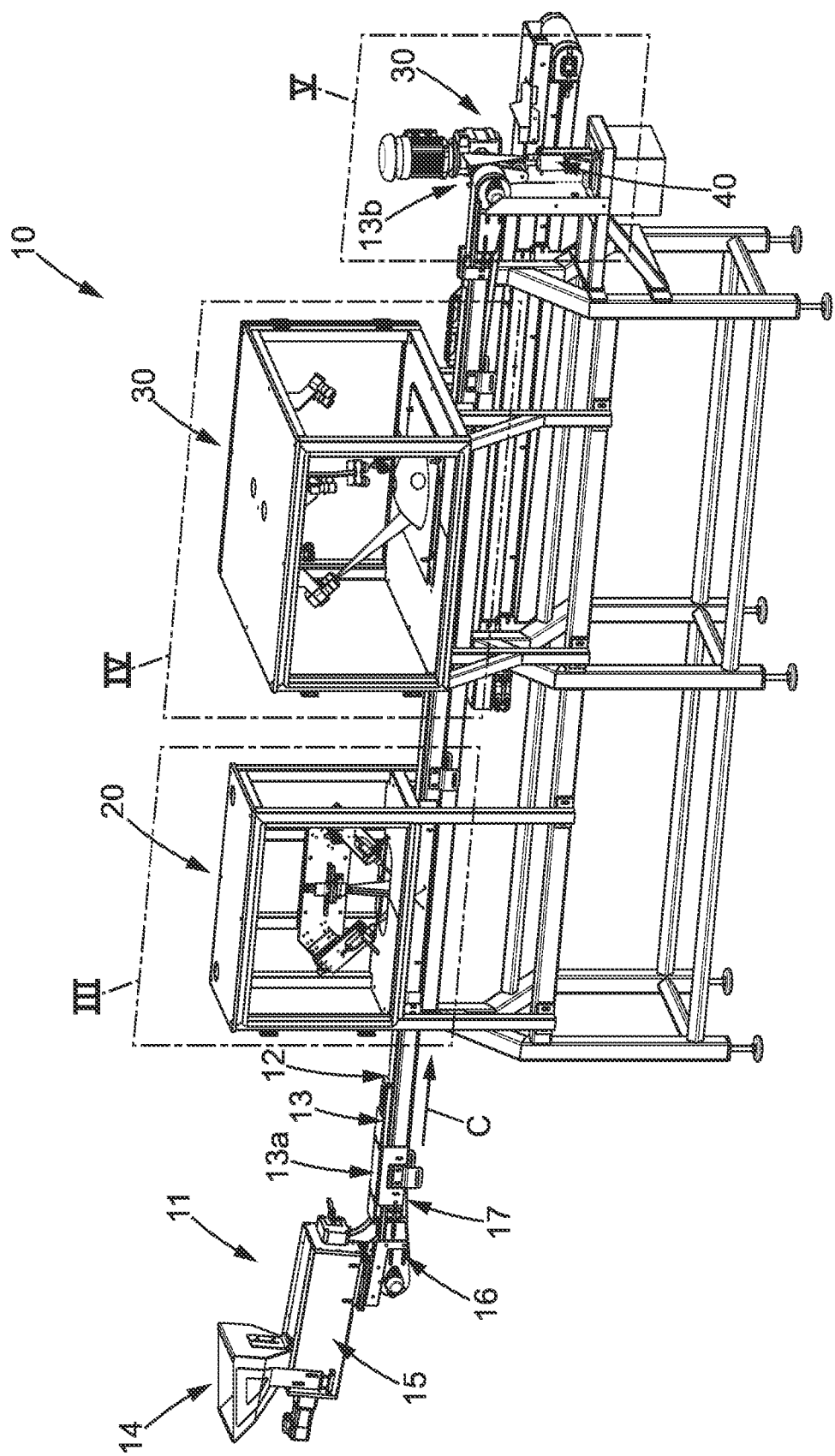
FIG. 2 is a perspective view of a station for implementing a method for sorting corn kernels according to an embodiment of the invention, the station being configured to determine an orientation of the corn kernel and to sort corn kernels according to ploidy level of their respective embryos.

FIG. 2 illustrates an embodiment of station 10 for implementing a method for sorting corn kernels of a batch of corn kernels. In the illustrated embodiment, the station 10 is configured to determine an orientation of the corn kernel, which orientation is defined by an arrangement of at least one of the longitudinal axis L, the tip 2, the top 3, the embryo area 4a, the pericarp 6 and the pericarp top area 6a of the corn kernel with respect to a reference frame of the station 10. The station 10 is also configured to sort corn kernels according to ploidy level of their respective embryos.

To that end, the station 10 comprises:

a supply system 11 to deliver corn kernels 1 in an individualized manner, an orientation imaging system 20 configured to acquire one or several orientation images of the corn kernel 1, a coloration imaging system 30 configured to acquire one or several coloration images of the corn kernel 1, a central unit connected to the orientation imaging system 20 and the coloration imaging system 30 for processing orientation and coloration images (not shown).

In the illustrated embodiment, the supply system 11 is configured to convey each of the corn kernels 1 on a support surface 12 along a path in a conveying direction C. The supply system 11 comprises a conveyor 13 in the form of an endless band running from an upstream end 13a to a downstream end 13b through the orientation 20 and coloration 30 imaging systems. Each corn kernel 1 has then a resting surface in contact with the support surface 12, and an upper surface opposite the resting surface.

At the upstream end 13a of the conveyor 13, the supply system 11 comprises a hopper 14 supplied with corn kernels 1 by a vibrating plate of a reservoir containing the batch of corn kernels 1. The hopper 14 drives the corn kernels 1 in a system 15 with two endless screws having an increasing pitch. These screws enable speed of the corn kernels 1 to be increased and corn kernels to be separated from each other so as to be individualized. Corn kernels 1 are laid onto the support surface 12 of the conveyor 13 by a slide 16 configured to accelerate the corn kernels 1 until they reach a speed equal to that of the conveyor 13. At an outlet of the slide 16, two guiding elements 17 position the corn kernel 1 in a median part of the conveyor 13 with respect to a transverse direction perpendicular the conveying direction C. The conveyor 13 may be provided with honeycombs preventing the corn kernel 1 from moving until it is ejected along the path or at the downstream end 13b. The conveyor 13 may by slightly concave about the outlet of the slide 16 to become flat subsequently so that each individual corn kernel 1 can be positioned appropriately without perturbing subsequent image analyses (central position of the conveyor). For example, the conveyor 13 may have a speed of 1 m/s and the corn kernels 1 are spaced apart from each other of 25 mm to be viewed by MS cameras.

At the downstream end 13b of the conveyor 13, the corn kernel 1 may be dropped.

The orientation imaging system 20 aims at detecting and determining where the embryo 4 of the corn kernel 1 is located, namely whether it is visible or hidden on the conveyor 13, and if it is visible, in which direction it is oriented.

The orientation imaging system 20 has a modality adapted to enable structural features of the corn kernel 1 to be measured on the orientation image.

Figure 3:
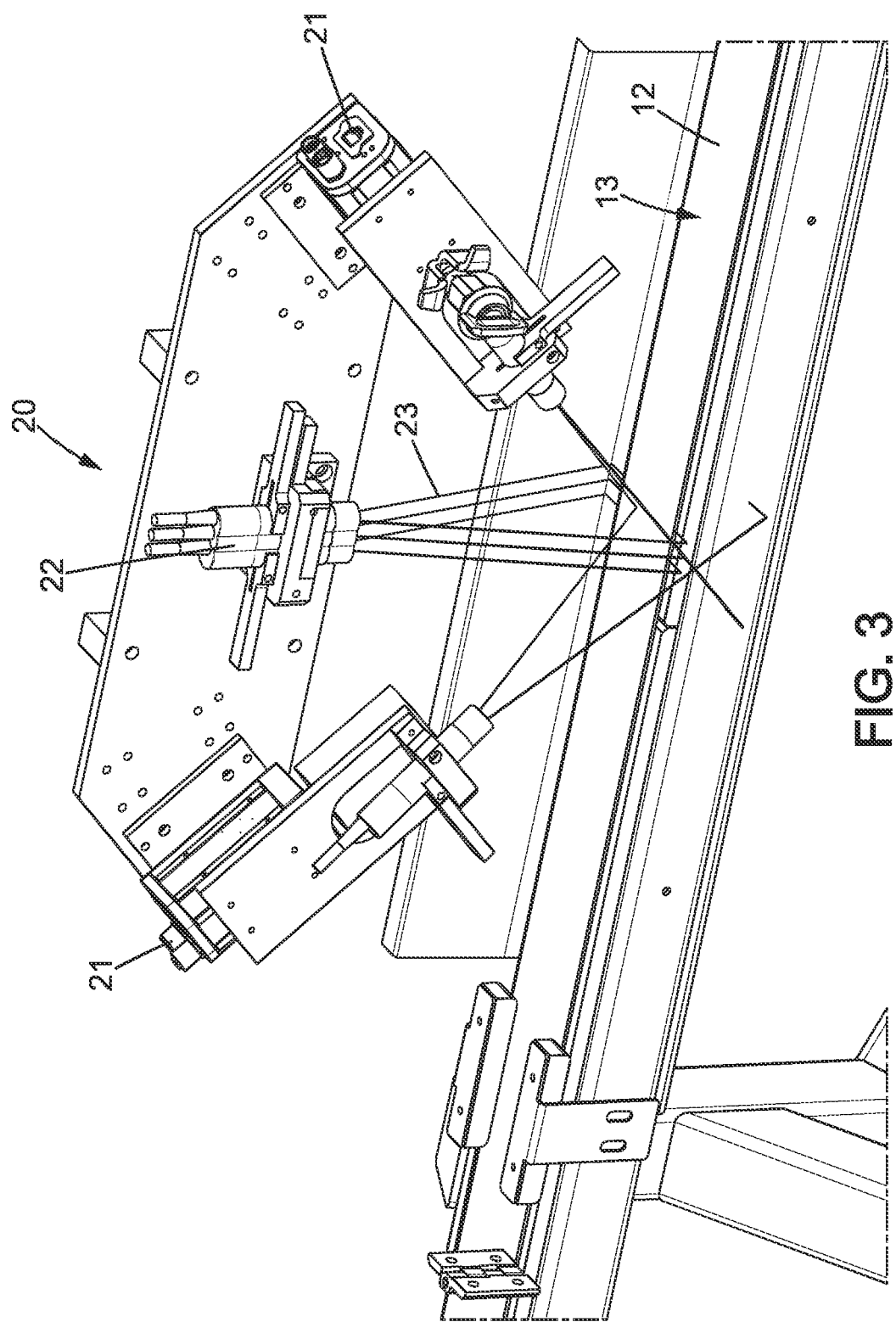
FIG. 3 is a perspective view the detail referenced III on FIG. 2, illustrating an orientation imaging system configured to acquire an orientation image of a corn kernel.

On FIG. 3, the orientation imaging system 20 is configured to acquire a three-dimension (3D) image of the corn kernel 1. The orientation imaging system 20 is arranged above the support surface 12 of the conveyor 13 and comprises two orientation imaging devices 21 configured to acquire respective orientation images of the corn kernel 1 along different viewing directions oriented towards the support surface 12. One of the orientation imaging devices 21 is arranged so that the viewing direction is inclined, for example with an angle of 45°, with respect to the support surface 12 and oriented towards the upstream end 13a of the conveyor 13. The other orientation imaging devices 21 is arranged so that the viewing direction is inclined, for example with an angle of 45°, with respect to the support surface 12 and oriented towards the downstream end 13b of the conveyor 13. The orientation imaging devices 21 of the orientation imaging system 20 are composed of two-dimension (2D) cameras 21 associated to a laser device 22 arranged to lighten the corn kernel 1 with a laser line 23 and to measure the distance between the object and the camera, by a triangulation 3D method, also named triangulation laser method. A 3D image of the kernel may then be constructed as orientation image. Other methods well known to the person skilled in the art may be used to construct this 3D image as the time of flight method. For example, the orientation imaging system 20 comprises two cameras Sick Ranger E50 directed in opposite directions towards a zenithal laser line 23 that is perpendicular to the conveyor 13. The cameras may have a capacity of 4000 images/second. The association of two cameras allows the identification of the orientation of a consequent number of kernels, one can imagine adding subsequent camera to improve the rate of identification of kernel orientation.

Alternatively, structural feature of the corn kernel 1 could be determined/calculated directly from raw data obtained by the 2D camera without creation of the kernel 3D image. The use of a unique camera can also be a way to pursue the invention for with a lower rate of kernel orientation, convex area for example can only be identified for some specific kernel orientations.

In further alternative embodiments, the orientation imaging system may comprise only one orientation imaging device, for example a three-dimensional (3D) camera, or more than two orientation imaging devices.

A first ejection zone can be provided at the outlet of the orientation imaging system 20. The first ejection zone may be composed, for example, of one sole ejection member blowing continuously unless a corn kernel 1 detected as conform. Such first ejection zone aims at ejecting non conform kernels, for example ICE position with an inclination more than 50° as well as those for which the orientation cannot be correctly detected by the orientation imaging system 20 (broken, eaten kernels) or kernel of too small size. The conformity may be related to any orientation. In this specific device, all the kernels with determined orientation are kept and detection is done relatively to this orientation. But this device can also be used to keep only kernel positioned in a specific orientation, kernel with the embryo on the resting surface "back position" or kernel with embryo opposite the resting surface "embryo position" for examples.

Figure 6:
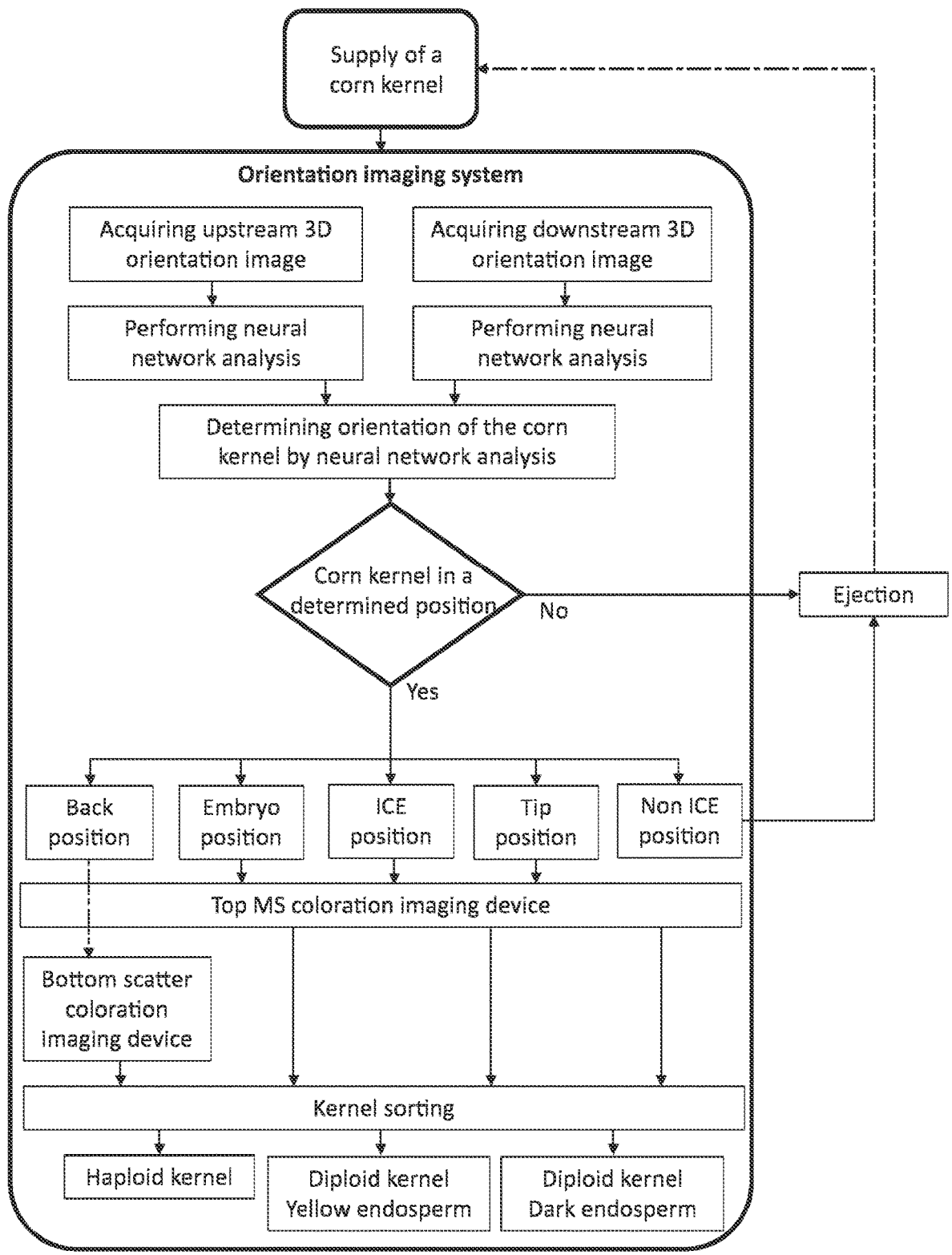
FIG. 6 is a diagram illustrating processing steps performed to sort the corn kernels according to their orientation on the basis of orientation images acquired by the orientation imaging system of FIG. 3.
Figure 7:
FIG. 7 is a diagram illustrating processing steps of a neural network analysis implemented to determine the orientation of the corn kernel, FIG. 8 comprises different schematic views along different orientation of the corn kernel illustrating structural features of the corn kernel used to perform the neural network analysis of FIG. 7.
Figure 8:
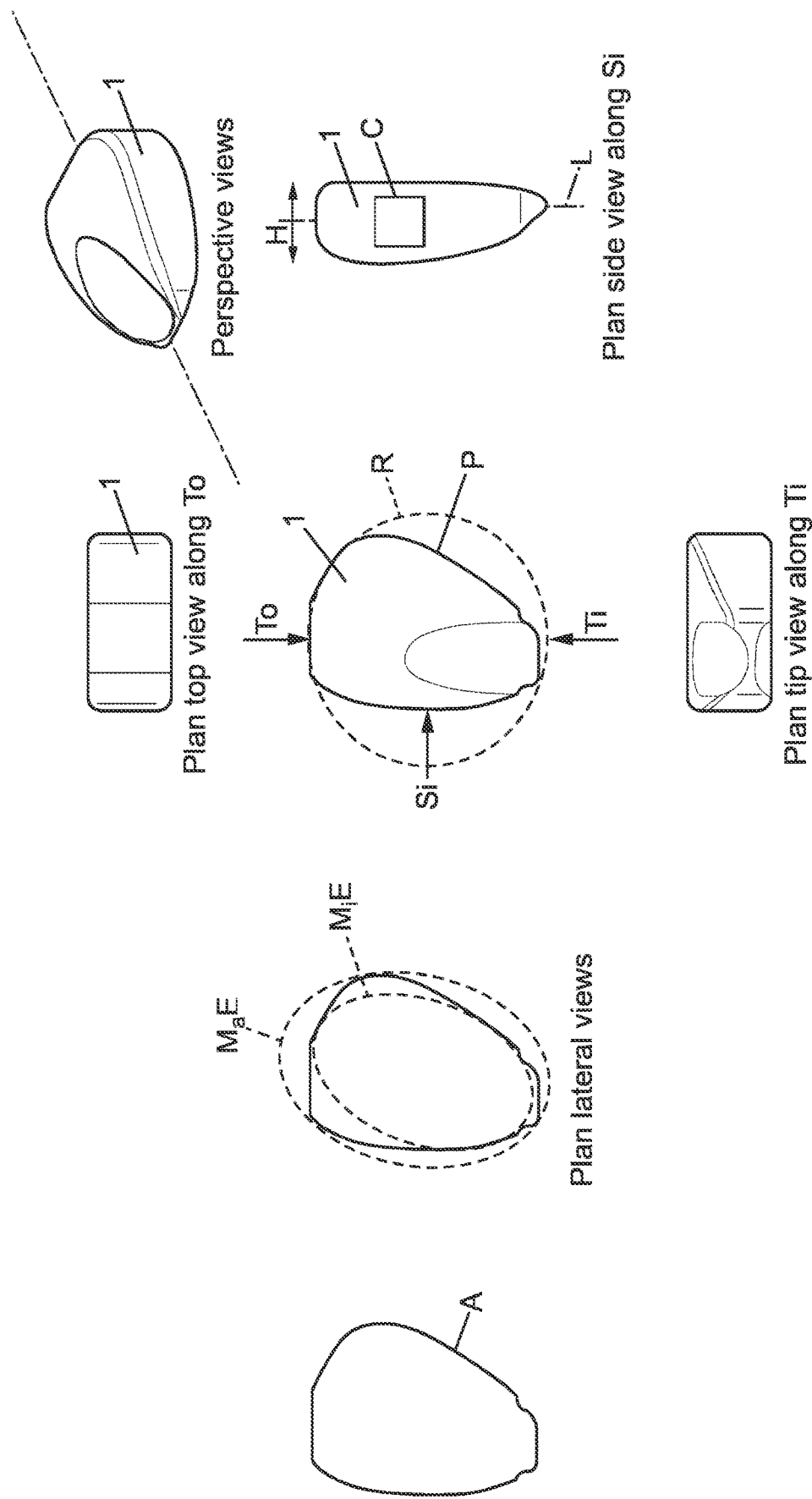

As apparent from FIGS. 6 to 8 illustrating an operation of the orientation imaging system 20 to determine the orientation of the corn kernel 1, the orientation imaging system 20 acquires an upstream 3D orientation image and a downstream 3D orientation image of the upper surface of the corn kernel 1, respectively by the orientation imaging devices 21. The orientation images are processed in parallel by a same algorithm providing a 3D description of 3D data measured in each orientation image. The 3D descriptions of the upstream and downstream 3D orientation images can be combined to provide the structural features of the kernel.

The corn kernel is sorted as regards its orientation through a neural network analysis in which each network, noted NNi, is supplied with structural features extracted from the 3D data.

The structural features extracted from the 3D orientation images supplied to each neural network are listed in the table below in connection with FIG. 8. For each NNi, some structural feature can be missing and mathematical models can be used to deduce the missing feature from the others measured feature. These mathematical models can be deduced from the collected data by the described device.

| No | Name | Description | NN1 | NN2 | NN3 | NN4 |
|---|---|---|---|---|---|---|
| 1 | Height | Height of the kernel | | | | |
| 2 | Area | Appearing surface | | | | |
| 3 | Perim | Appearing external perimeter | | | | |
| 4 | Solidity | Deviation Vs a convex form by surface measurement | | X | X | X |
| 5 | Convexity | Deviation Vs a convex form by perimeter measurement | | | X | |
| 6 | Elongation | Stretching | | | X | X |
| 7 | Roundness | Deviation Vs a circular form | | X | | |
| 8 | EllipsMajor | Length of the large axis of an elliptic model | | | | X |
| 9 | EllipsMinor | Length of the small axis of an elliptic model | X | | | X |
| 10 | Mean | Grey mean value | | X | | |
| 11 | StdDev | Grey standard deviation | | | X | X |
| 12 | Dist. Centros | Centroid euclidian distance and grey centroid | X | X | X | X |
| 13 | UP Skew | Radial mean slope | | | X | X |
| 14 | UP Mean | Grey mean value | | X | X | |
| 15 | UP StdDev | Grey Standard deviation | X | | X | X |
| 16 | UP nBlobs | Number of connex components | | X | | X |
| 17 | UP Elongation | Stretching | X | X | X | X |
| 18 | UP roundness | Deviation Vs circular form | | X | X | X |
| 19 | UP Perim. ratio | Ratio high area perimeter on kernel perimeter | X | X | X | |
| 20 | HistoHeigth | Height according to histogram | X | X | X | X |
| 21 | UP centricity | Distance connex component to centroid | X | X | | X |
| 22 | UP solidity | Deviation Vs a convex form by surface measurement | | X | X | X |
| 23 | UP convexity | Deviation Vs a convex form by perimeter measurement | | | X | X |
| 24 | UP area | Appearing surface | | | X | X |

Structural Features from Orientation Images

N.B.: structural features No. 13 to 24 the names of which are preceded by the prefix UP are made on the upper surface of the corn kernel 1, namely the surface opposite the resting surface.

The structural feature "Height" refers to the height H of the corn kernel measured in a direction perpendicular to the longitudinal axis L as shown on FIG. 8.

The structural feature "Area" refers to an appearing surface A of the corn kernel on the orientation image acquired by the orientation imaging system 20 as shown on FIG. 8.

Similarly, the structural feature "Perim" refers to an appearing external perimeter P of the corn kernel on the orientation image acquired by the orientation imaging system 20 as shown on FIG. 8.

The structural feature "Solidity" refers to a deviation of a form of the corn kernel with respect to a convex form by surface measurement, a convex form defined by a plurality of points such that each segment between two points is fully arranged within the form.

The structural feature "Convexity" refers to a deviation of a form of the corn kernel with respect to a convex form by perimeter measurement.

The structural feature "Elongation" refers to a stretching of the corn kernel, namely a length of the large axis of an ellipsoid (in three dimensions) encompassing the outer surface of the corn kernel.

The structural feature "Roundness" refers to a deviation of a form of the corn kernel with respect to a circular form R as shown on FIG. 8.

The structural feature "EllipsMajor" refers to a length of the large axis of a major ellipse $M_aE$ (in two dimensions), shown on FIG. 8, encompassing the perimeter of the corn kernel as viewed on the orientation image acquired by the orientation imaging system 20.

Similarly, the structural feature "EllipsMinor" refers to a length of the small axis of a minor ellipse $M_iE$ (in two dimensions), shown on FIG. 8, included within the perimeter of the corn kernel as viewed on the orientation image acquired by the orientation imaging system 20.

The structural feature "Mean" refers to a mean value of grey intensity measured on the orientation image acquired by the orientation imaging system 20 in a central area C of the outer surface of the corn kernel, as shown on FIG. 8.

The structural feature "StdDev" refers to a standard deviation of grey intensity measured on the orientation image acquired by the orientation imaging system 20 in the central area C of the outer surface of the corn kernel, as shown on FIG. 8.

The structural feature "Dist. Centros" refers to a Centroid Euclidian distance and grey centroid. For each zone of the corn kernel, mainly the embryo and the pericarp, an axis of a mean of the Gaussian curve of grey intensity measured on the orientation image acquired by the orientation imaging system 20 is searched and the Centroid Euclidian distance is a distance between the axes of the two zones is calculated. The grey centroid corresponds to the centroid of the histogram of grey intensity measured on the orientation image acquired by the orientation imaging system 20.

The structural feature "UP Skew" refers to a radial mean slope. The slope or gradient of a line is a number that describes both the direction and the steepness of the line, in our case it mainly describes the manner with which the upper part of the corn kernel is oriented decreasing or increasing and the degree of this slope or gradient.

The structural feature "UP nBlobs" refers to some connex components of the upper surface, each connex component comprising pixels sharing similar parameters on the orientation image acquired by the orientation imaging system 20 and differing from pixels of adjacent connex components, The structural feature "UP Perim Ratio" refers to a ratio of a high area perimeter, namely the area of the upper surface viewed by the orientation imaging system 20, on the corn kernel perimeter P.

The structural feature "HistoHeigth" refers to a height of the corn kernel according to histogram, namely a distribution of the heights measured on the upper surface viewed by the orientation imaging system 20.

The structural feature "UP centricity" refers to the distance of the grey intensity measured on the orientation image acquired by the orientation imaging system 20 of each connex component to centroid of the grey intensity measured on the orientation image acquired by the orientation imaging system 20 of the zone. It corresponds to a dispersion parameter.

A first neural network NN1 distinguishes corn kernels 1 in a position "laying flat" from corn kernels 1 in a position "non laying flat". To that end, it is determined whether the resting surface of the corn kernel 1 is substantially parallel to the longitudinal axis L.

If the resting surface of the corn kernel is substantially parallel to the longitudinal axis, the corn kernel is sorted as being in a position "laying flat" and a second neural network NN2 separates the corn kernels 1 of NN1 in the position "laying flat" between "back position" and "embryo position". In particular, it is determined whether the resting surface of the corn kernel 1 includes the embryo area 4a. If the resting surface of the corn kernel 1 includes the embryo area 4a, the corn kernel 1 is sorted as being in the back position with the back surface opposite the embryo area 4a up, and if the resting surface of the corn kernel 1 includes the back surface of the corn kernel 1, the corn kernel is sorted as being in the embryo position with the embryo area 4a up.

A third neural network NN3 separates the corn kernels 1 of NN1 in the position "non laying flat" between "tip position" and "non tip position". In particular, if the resting surface of the corn kernel 1 not is substantially parallel to the longitudinal axis L, the corn kernel is sorted as being in the position "non laying flat" and it is determined whether the resting surface includes the pericarp top area 6a. If the resting surface includes the pericarp top area 6a, the corn kernel 1 is sorted as being in the "tip position" with the tip 2 up.

A fourth neural network NN4 separates the corn kernels 1 of NN3 in the "non tip position" between an "inclined central embryo (ICE)" position and a "non inclined central embryo" position. In particular, if the resting surface does not include the pericarp top area 6a, an inclination of the corn kernel 1 with respect to the support surface 12 is measured, and if the inclination is less than 50°, the corn kernel 1 is sorted as being in the "inclined central embryo (ICE)" position.

The classification by neural networks NNi of the two orientation imaging devices 21 and the 3D description can be combined to decide whether:

a 3D analysis is impossible (NNi uncertain, corn kernel too small, corn kernel touching an edge of the orientation image, . . . ): the corn kernel 1 is ejected in the first ejection zone, this kernel may be discarded or should be sent to the entry of the device for a second round of analysis (dotted line); on the same way, the kernels classified as ICE position with an inclination of more than 50° are ejected, "back position": a coloration image of the upper surface of the corn kernel 1 may be acquired by a top coloration imaging device 31 of the color imaging system 30 for a yellow detection and, if positive for yellow detection the kernel is presumed to be diploid (yellow kernel) and ejected, if negative for yellow detection, a coloration image will be acquired by the bottom coloration imaging device to determine whether the corn kernel 1 is haploid or diploid (FIG. 12), "embryo position", "tip position" and "ICE position": a coloration image of the upper surface of the corn kernel 1 is acquired by in the top imaging device 31 and processed according to a yellow analysis and a MS processing to determine whether it is haploid or diploid.

The orientation imaging system 20 also enables a pitch between kernels on the support surface 12 to be set. The analysis of upstream 3D orientation images may measure a deviation between the preceding kernel and the current kernel. The speed of the conveyor is measured by means of an encoding wheel arranged under the conveyor 13. If the deviation is too low (less than 25 mm), the current kernel is ejected in the first ejection zone.

Figure 4:
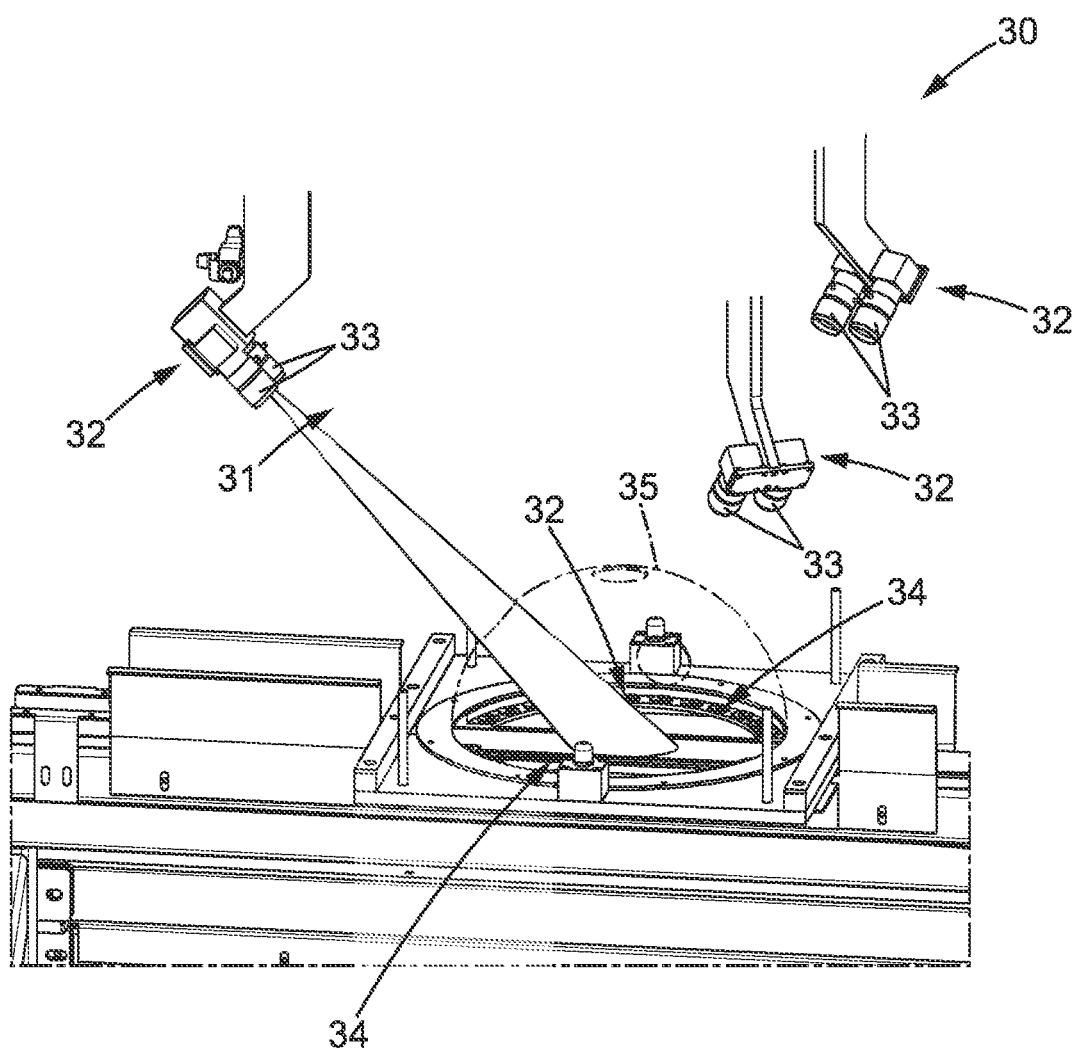
FIG. 4 is a perspective view the detail referenced IV on FIG. 2, illustrating a top coloration imaging device of a coloration imaging system configured to acquire a coloration image of the corn kernel.

As apparent from the above, in the illustrated embodiment, the coloration imaging system 30 includes several coloration imaging devices configured to acquire respective coloration images of the corn kernel 1 along different acquiring directions. In particular, the coloration imaging system 30 comprises a top coloration imaging device 31 (FIG. 4) arranged to face the support surface 12, and a bottom coloration imaging device 40 (FIG. 5) arranged below the support surface 12. The top 31 and bottom 40 coloration imaging devices are arranged respectively upstream and downstream with respect to the conveying direction C.

The coloration imaging devices 30, 40 of the coloration imaging system have a modality adapted to enable bright coloration and dark coloration to be distinguished on the coloration image.

In particular, the top coloration imaging device 31 comprises a plurality of pairs of lightening and imaging assemblies 32 distributed around the support surface 12. Each lightening and imaging assembly 32 comprises a multispectral (MS) camera 33 arranged to acquire a coloration image of the corn kernel 1 at a wavelength and a lightening device 34 configured to lighten the corn kernel 1 at the same wavelength. In addition, in each pair, one of the lightening and imaging assemblies 32 lightens the corn kernel 1 and acquires a coloration image of the corn kernel 1 at a wavelength $\lambda 1$ comprised between 550 nm and 700 nm, preferably between 600 nm and 650 nm, and the other lightening and imaging assembly lightens the corn kernel 1 and acquires a coloration image of the corn kernel 1 at a wavelength $\lambda 2$ comprised between 700 nm and 850 nm, preferably between 720 nm and 780 nm. As it will become apparent from the following of the description, and especially from example 1 below, the wavelength $\lambda 1$ comprised between 550 nm and 700 nm, preferably between 600 nm and 650 nm, especially of 630 nm has been found of particular interest to discriminate haploid and diploid corn kernels.

For example, the top coloration imaging device 31 can be made of six MS cameras 33 which are paired with, for each pair, images acquired at specific wavelengths:

$\lambda 1$=620 nm in the visible range,
$\lambda 2$=750 nm in the near infrared range.

To that end, the cameras of each pair may be equipped with appropriate filters.

The pairs of MS cameras 33 can be inclined at an angle of 50° with respect to the support surface 12 and distributed at an angle of 120° about the support surface 12.

The lightening device 34 in the top coloration imaging device 31 is composed of two series of 12 LEDs arranged in circle. A first series emits a light at the wavelength $\lambda 1$ of 620 nm whereas a second series emits a light at the wavelength $\lambda 2$ of 750 nm. In the illustrated embodiment, the two series of 12 LEDs are formed of two separate sets of 12 LEDs emitting sequentially lights at the wavelengths $\lambda 1$ and $\lambda 2$. In other embodiments, the two series could be formed of one single set of LEDs controlled in a suitable manner. Any other configuration of the lightening device 34 could be envisioned to provide the suitable lightening.

In order to have an homogenous and uniform lightening, a dome 35 covers the conveyor 13 and the lightening device 34. The dome 35 is provided with apertures arranged in correspondence with the fields of view of the MS cameras 33.

The top coloration imaging device 31 aims at determining if:

if the orientation imaging system 20 has determined that the kernel is in "back position" if the corn kernel 1 is yellow or not, and if the orientation imaging system 20 has determined that the embryo 4 of the corn kernel is visible, if the corn kernel is haploid or diploid.

A second ejection zone can be provided at an outlet of the top coloration imaging device 31. The second ejection zone can be composed of two ejection members:

a first ejection member blowing haploid corn kernels,
a second ejection member blowing diploid and yellow kernels.

These two last categories may be ejected on separate bins if ones want to use these kernel on a separate way.

Figure 9:
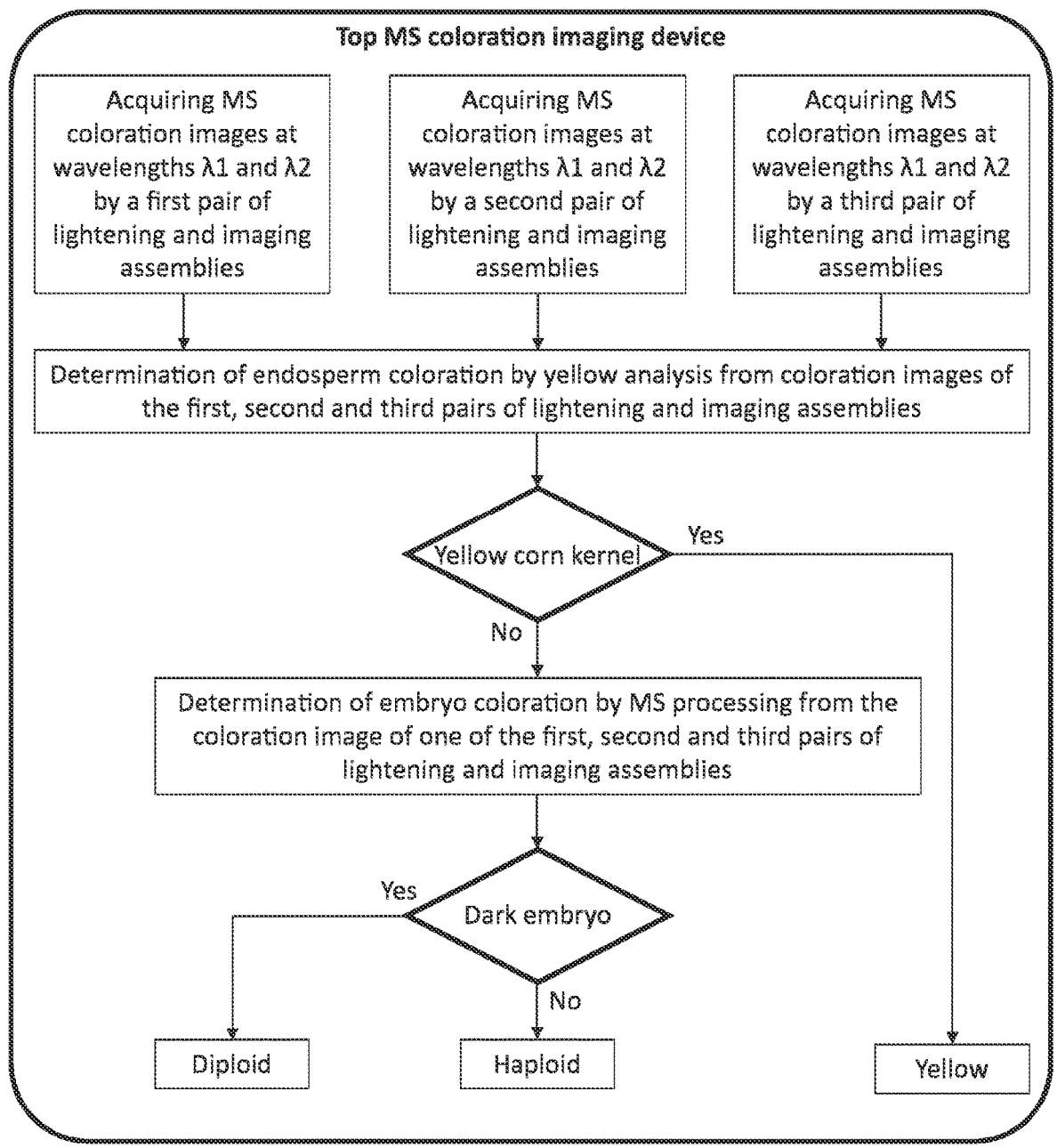
FIG. 9 is a diagram illustrating first processing steps performed to sort the corn kernels according to the ploidy level of their embryos on the basis of coloration images acquired by the top coloration imaging device of FIG. 4.
Figure 10:
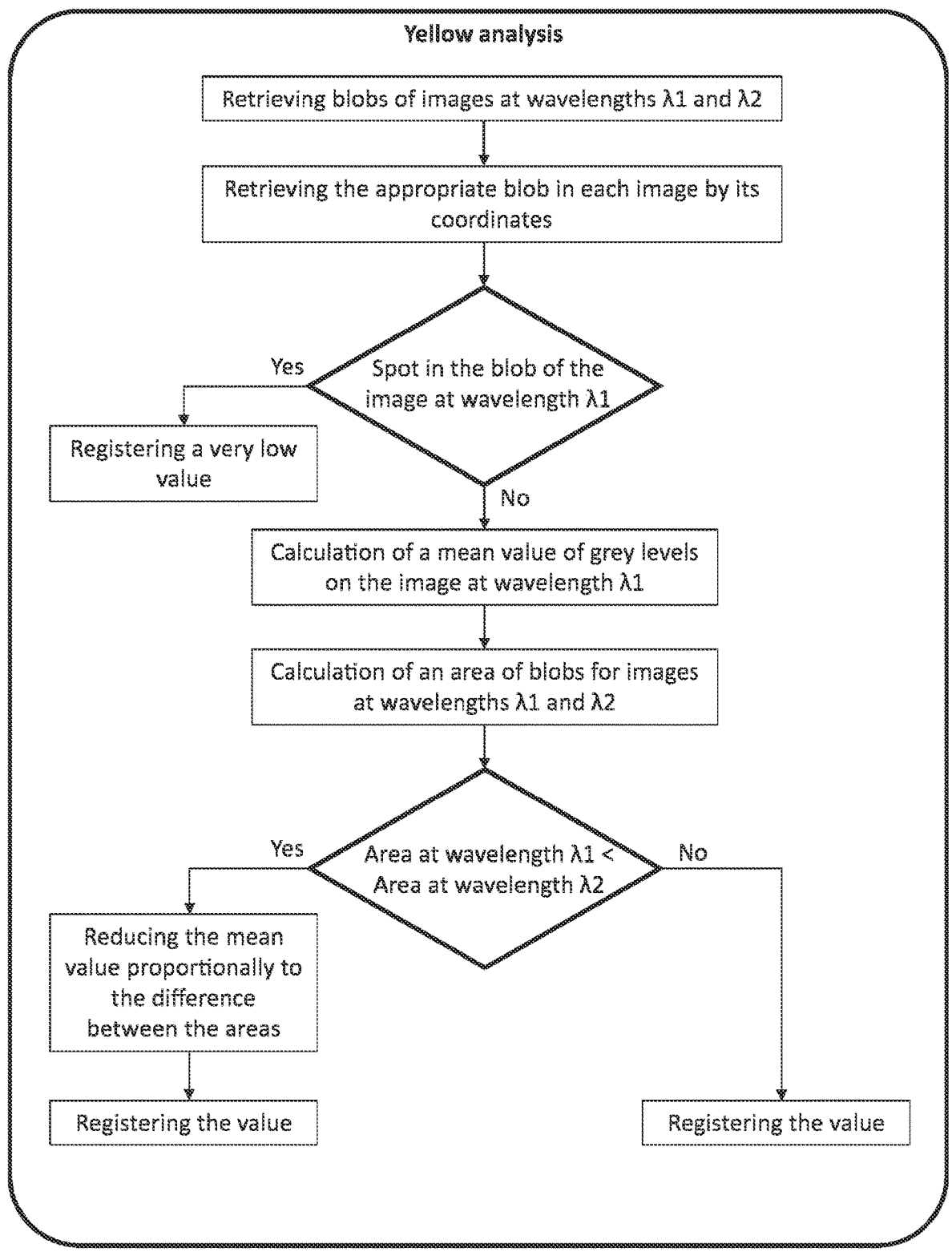
FIG. 10 is a diagram illustrating processing steps of a yellow analysis implemented during the first processing steps of FIG. 9.
Figure 11:
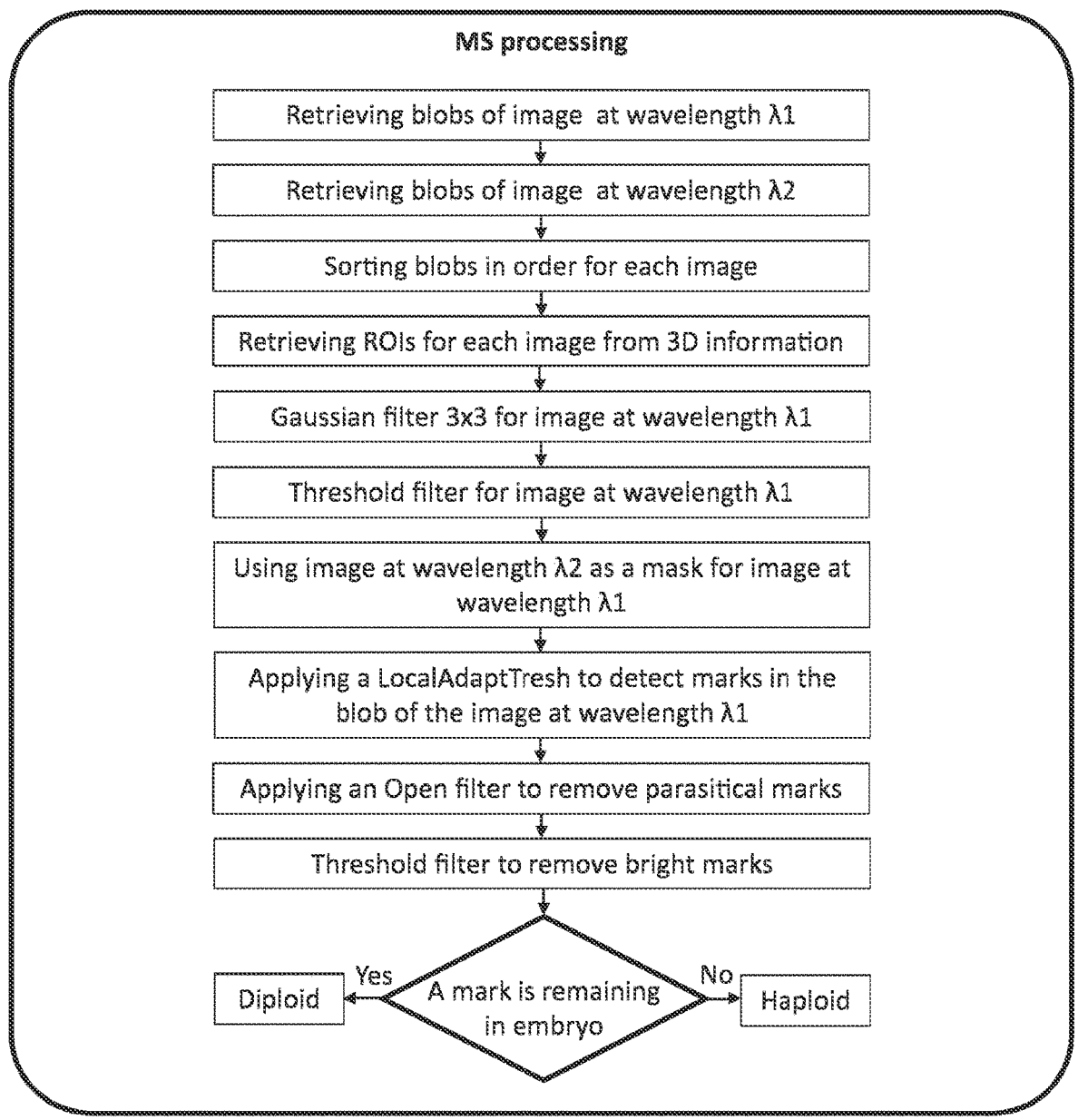
FIG. 11 is a diagram illustrating processing steps of a multispectral (MS) analysis implemented during the first processing steps of FIG. 9.

As apparent from FIGS. 9 to 11 illustrating an operation of the top coloration imaging device 31, for each corn kernel 1, the six MS cameras 33 trigger an acquisition of a coloration image to perform a yellow analysis based on a sole calculation of the mean grey level of the corn kernel 1 (FIG. 10). In substance, for the yellow analysis, the whole outer surface visible to the top coloration imaging device 31 at the two different wavelengths $\lambda 1$ and $\lambda 2$ is checked and if a dark coloration is detected, then the corn kernel is identified as non-yellow. Indeed, the images at the second wavelength $\lambda 2$ is used as a mask to discard parasite coloration on the endosperm not due to the R1-nj marker, the $\lambda 1$ wavelength has been selected as particularly relevant to detect the R1-nj marker coloration. The first step corresponds to a consolidation step of the tree images, each image being analysed independently in furthers steps. Resulting values for the tree images are combined to give a conclusion about "yellow analysis". If the corn kernel 1 is in back position, only such yellow analysis is performed. Else, if the corn kernel 1 is in the embryo position, the tip position or the ICE position, that is with the embryo 4 visible at least partly, the coloration image is further subjected to a MS processing by one of the pairs of lightening and imaging assemblies 32 selected according to the orientation of the corn kernel 1. More specifically, each pair of lightening and imaging assemblies 32 may acquire a coloration image of the corn kernel 1 but the data of the coloration images are weighted according to the orientation of the corn kernel: the data of the coloration image acquired by the pair of lightening and imaging assemblies 32 having the best orientation being provided with much weight than the other ones. The selected pair of lightening and imaging assemblies 32 makes a supplemental analysis to determine whether the corn kernel 1 is haploid or diploid based on the coloration between dark and bright of its embryo (FIG. 11). This second analysis is made especially by a thresholding on the image at 750 nm that will be used as a mask for the image at 620 nm. Then, another thresholding is made on the reduced image at 620 nm focuses on embryo area (ROI for Region Of Interest). The processing ends by a blob analysis in order to find a dark coloration of the embryo area indicating that the corn kernel 1 is diploid, else the corn kernel 1 is haploid. For corn kernels 1 in tip position, the processing may be reduced to a lower zone of the coloration image which reduces the calculation time and prevents false detections.

Figure 5:
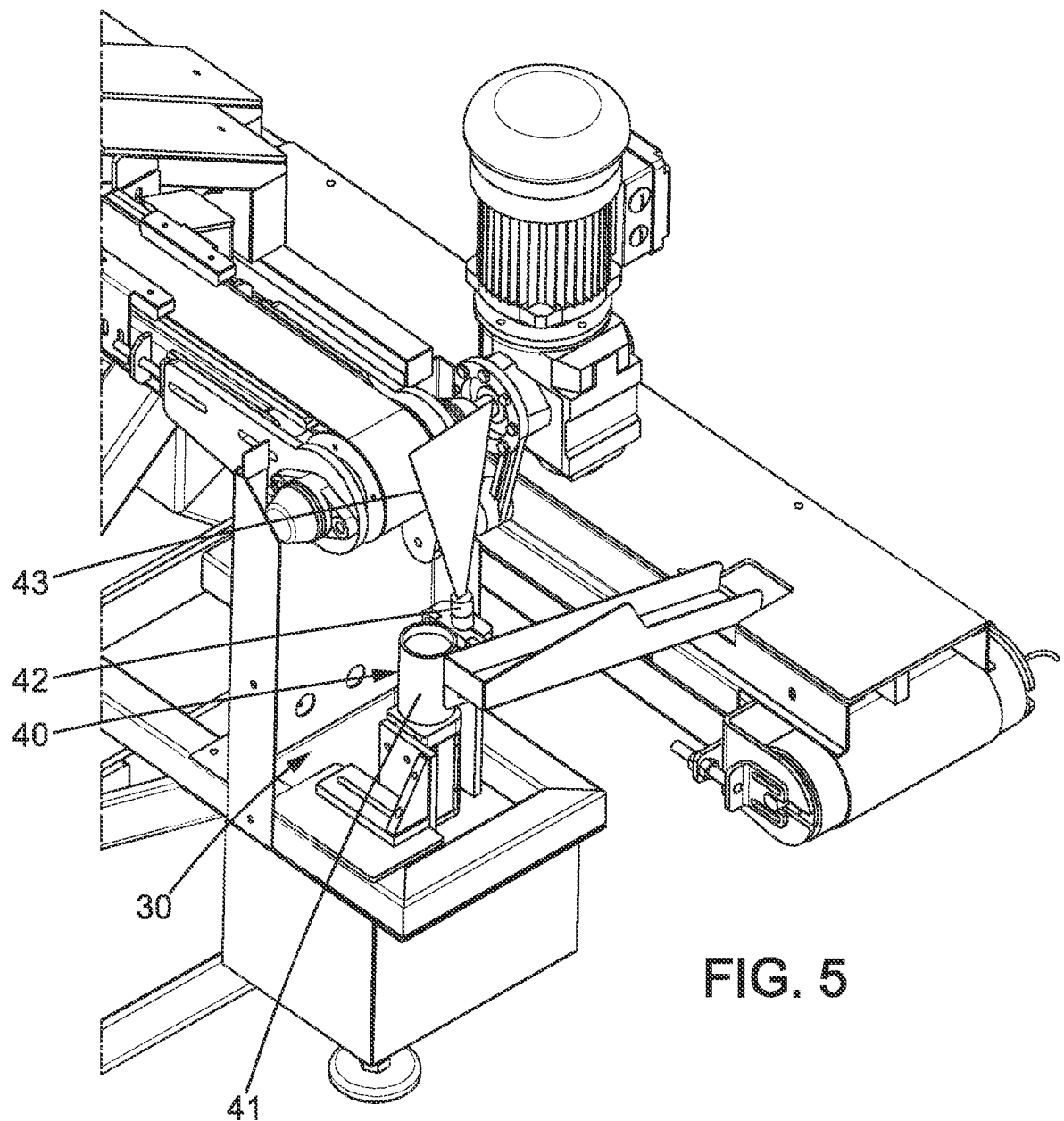
FIG. 5 is a perspective view the detail referenced V on FIG. 2, illustrating a bottom coloration imaging device of a coloration imaging system configured to acquire a coloration image of the corn kernel.

Therefore, when the corn kernel 1 has its embryo 4 visible, four analyses are performed: three yellow analysis and one MS processing. The data resulting from these analyses are combined to calculate a mean of the yellow analysis and to read a result of the MS processing:

if the corn kernel 1 is haploid, it is ejected by the first ejection member of the second ejection zone, if the corn kernel 1 is yellow, it is ejected by the second ejection member of the second ejection zone, if the corn kernel 1 is diploid, it is ejected by the second ejection member of the second ejection zone, if the corn kernel 1 is in back position and not yellow, it continues on the conveyor towards the bottom coloration imaging device 40 (FIG. 5).

For a simple yellow analysis, the time for acquiring and processing the image is about 15 ms. When the kernel has its embryo visible, the supplemental analysis adds at most 10 ms.

The bottom coloration imaging device 40 comprises a scatter camera 41, such as a ranger camera in scatter mode, arranged to acquire a scatter coloration image of the corn kernel 1. A laser device 42 is arranged to lighten the corn kernel 1 with a laser line 43. The specific wavelength of the laser is 620 nm.

The bottom coloration imaging device 40 is arranged to sort the corn kernel 1 that has not been sorted previously. In particular, the bottom coloration imaging device 40 is arranged to acquire the coloration image as the corn kernel is dropped. The corn kernel 1 reaching the bottom coloration imaging device 40 is then viewed from below. An air jet is positioned horizontally above the camera to prevent dust to interfere with the imaging.

Figure 12:
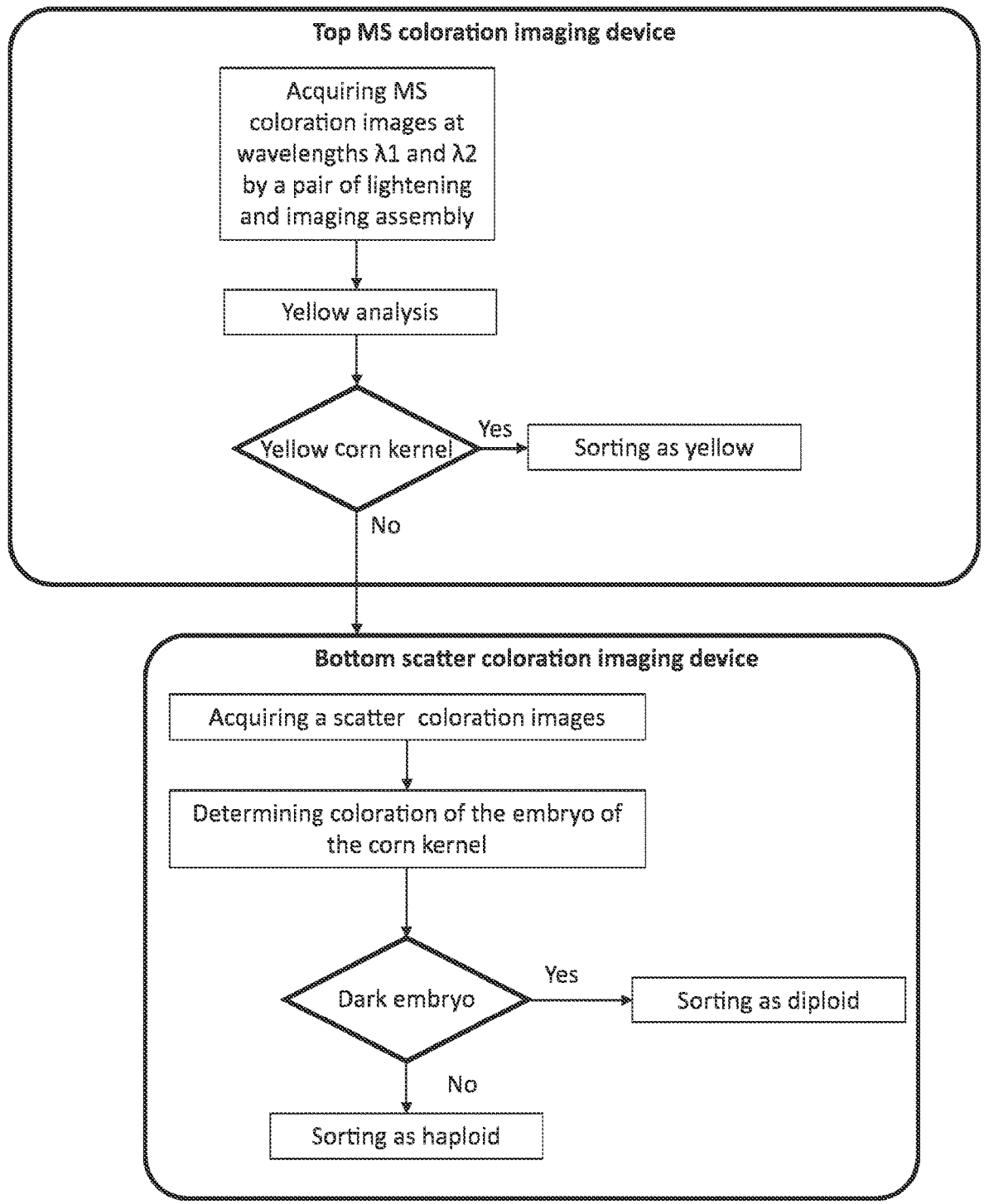
FIG. 12 is a diagram illustrating second processing steps performed to sort the corn kernels according to the ploidy level of their embryos on the basis of coloration images acquired by the bottom coloration imaging device of FIG. 5.

FIG. 12, the bottom coloration imaging device 40 determines whether the kernel is haploid or diploid for kernels having the embryo resting on the conveyor, the "yellow kernel" having been ejected after the step 30. Coloration of the kernel at this step is mainly considered as embryo coloration due to the relative size of the embryo to the kernel and the dark coloration is search in the center of the images to focuses on the embryo. Marker coloration has been observed (personal results) to be mainly in the second third part of the embryo considered from the Tip position, so coloration is mainly in the center part of this kernel. The dark coloration of the embryo which characterizes diploid kernels appears as an absorption zone in scatter mode.

A third ejection zone can be provided at an outlet of the bottom coloration imaging device 40. The third ejection zone can be composed of one ejection member blowing haploid corn kernels as they are dropped, diploid kernels dropping without being deviated. If dark coloration is detected in a central part of the corn kernel 1 view from below, the corn kernel is diploid and will continue its drop. Else, it will be blown as haploid by the ejection member.

The acquisition of the coloration image and the ejection are performed when the corn kernel 1 arrives beyond the conveyor 13 and begins to drop. The scatter analysis lasts about 2 ms or 3 ms which makes it possible to decide before ejection which is arranged about 4 cm behind the scatter camera.

Example 1

Identification of the most appropriate wavelength to discriminate haploid and diploid corn kernels.

Two lots of 15 corn kernels from various genotype have been used: one with haploid corn kernels and the other with diploid corn kernels. Corn kernels are oriented in embryo position (embryo up). Independent measures of reflectance at 19 different wavelengths by a MS camera of the type VideometerLab oriented to view the embryo of the corn kernels have been done and some differences appeared between the two lots of corn kernels. A linear discrimination analysis (LDA) has been done on the results. The analysis is performed pixel by pixel. The aim is to classify each of the pixels of each corn kernel in one of the haploid and diploid groups. Therefore, the input included all the pixels of each of the corn kernels, and each of the pixels had 19 features: the 19 values of grey level on 8 bits of MS images. The LDA algorithm classified each pixel in one of the haploid and diploid groups.

Figure 13:
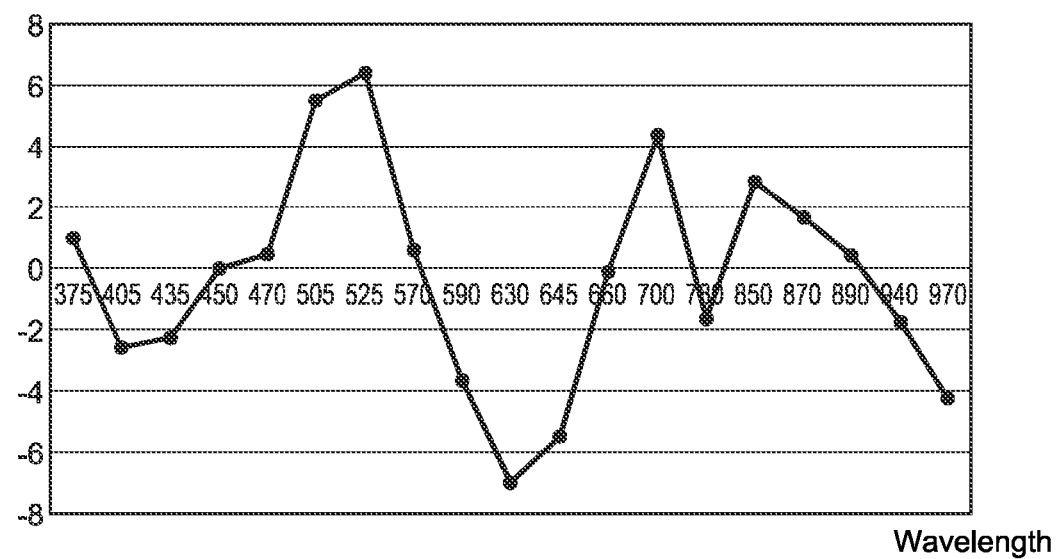
FIG. 13 is a diagram illustrating a coefficient of a projection vector obtained by linear discrimination analysis (LDA) as a function of wavelengths, resulting from MS images of one lot of 15 haploid corn kernels and one lot of 15 diploid corn kernels acquired at 19 different wavelengths.

FIG. 13 illustrates a coefficient of a projection vector obtained by linear combination of the different parameters as a function of the wavelengths. The wavelength of 630 nm has been identified has one of the most discriminant wavelength to discriminate haploid from diploid corn kernels whatever the genotype analyzed. This result has been confirmed by larger experiments.

Moreover, systematic determination of coloration at this wavelength of 630 nm has been shown to be difficult for corn kernels containing colored zone not due to presence of the R1-nj marker. The proposed solution solves this problem with the use of a second filter around 750 nm as a mask (FIGS. 10 and 11).

Example 2

200 kernels have been used to test the device (50% of haploid and 50% of diploids). With a standard setting of the device the sorting into two lots can be obtain with only 1% of diploid seed into the haploid lot and 21% of haploids into the diploid lot.

Chaikam V. and Prasanna B M, Doubled haploid Technology in maize breeding: theory and practice, CIMMYT, 2012;

Chang, M. T., and E. H. Coe, 2009: Double Haploids. In: A. L. Kriz, and B. A. Larkins (eds), Molecular Genetic Approaches to Maize Improvement, Springer Berlin Heidelberg, Berlin. Biotechnology in Agriculture and Forestry. 63, 127-142;

Chase, S. S., 1969: Monoploids and monoploid-derivatives of maize (*Zea mays* L.). Bot. Rev. 35, 117;

Coe E. H. 1959, A line of maize with high haploid frequency. Am Nat. 93: 381-382.

Fuente, G. N. de la; Carstensen, J. M.; Edberg, M. A.; Lubberstedt, T., Plant Breeding, 136 (1):50-60; 2017, Discrimination of haploid and diploid maize kernels via multispectral imaging.

Geiger, H. H., and G. A. Gordillo, 2010: Doubled Haploids in Hybrid Maize Breeding. Maydica 54, 485-499;

Greenblatt I M; Bock M., A commercially desirable procedure for detection of monoploids in maize., *JOURNAL OF HEREDITY,* 58: 9-13;

Lashermes P; Beckert M., Genetic Control Of Maternal Haploidy In Maize (*Zea Mays*l.) And Selection Of Haploid Inducing Lines., *Theoretical And Applied Genetics,* 76(3): 405-410;

Rotarenco, V. A., I. H. Kirtoca, A. G. Jacota. 2007. Possibility to identify kernels with haploid embryo by oil content. Maize Genet Newsl. 81:11;

Li L, Xu X, Jin W, Chen S (2009) Morphological and molecular evidences for DNA introgression in haploid induction via a high oil inducer CAUHOI in maize. Planta 230:367-376;

Nanda, D., and S. Chase, 1966: An embryo marker for detecting monoploids of maize (*Zea mays* L.). Crop Sci. 6, 213-215;

Rober, F. K., G. A. Gordillo, and H. H. Geiger, 2005: In vivo haploid induction in maize—performance of new-inducers and significance of doubled haploid lines in hybrid breeding. Maydica 50, 275-283;

Smelser A., M. Blanco[1], T. Lübberstedt, A. Schechert, A. Vanous and C. Gardner; Weighing in on a method to discriminate maize haploid from hybrid seed. Plant Breeding, Volume 134, Issue 3, pages 283-285, June 2015.

YU W C in MOLECULAR BREEDING, 36(1) (2016). A green fluorescent protein-engineered haploid inducer line facilitates haploid mutant screens and doubled haploid breeding in maize.

The invention claimed is:

1. A method for sorting corn kernels of a batch of corn kernels, wherein each corn kernel extends along a longitudinal axis between a tip with which said corn kernel was attached to a cob, and a top opposite the tip, each of the corn kernels presenting an outer surface including an embryo area in the vicinity of an embryo of the kernel, and a pericarp, the pericarp having a pericarp top area at the vicinity of the top, the method comprising the steps of:

laying the corn kernel on a support surface, the corn kernel having a resting surface in contact with the support surface, and an upper surface opposite the resting surface, acquiring at least one orientation image of the corn kernel with an orientation imaging system, the orientation imaging system positioned above the support surface, the orientation imaging system having a modality adapted to enable structural features of the corn kernel to be measured from above the upper surface at an inclined angle, determining an orientation of the corn kernel with respect to the support surface based on the structural features of the corn kernel measured on the orientation image, sorting the corn kernel as a function of an orientation of the corn kernel, wherein during the step of determining an orientation of the corn kernel, it is determined whether the resting surface of the corn kernel is substantially parallel to the longitudinal axis, if the resting surface of the corn kernel is substantially parallel to the longitudinal axis, the corn kernel is sorted as being in a position laying flat and it is determined whether the resting surface of the corn kernel includes the embryo area;

if the resting surface of the corn kernel includes the embryo area, the corn kernel is sorted as being in a back position with a back surface opposite the embryo area up;

if the resting surface of the corn kernel includes the back surface of the corn kernel, the corn kernel is sorted as being in an embryo position with the embryo area up;

if the resting surface of the corn kernel is not substantially parallel to the longitudinal axis, the corn kernel is sorted as being in a position non laying flat and it is determined whether the resting surface includes the pericarp top area, if the resting surface includes the pericarp top area, the corn kernel is sorted as being in a tip position with the tip up, if the resting surface does not include the pericarp top area, an inclination of the longitudinal axis of the corn kernel with respect to the support surface is measured, if the inclination is less than 50°, the corn kernel is sorted as being in an inclined centered embryo position.

2. The method according to claim 1, wherein the orientation imaging system is configured to acquire a three-dimension orientation image of the corn kernel, and wherein during the step of acquiring at least one orientation image of the corn kernel, at least one three-dimension orientation image of the corn kernel is acquired.

3. The method according to claim 2, wherein the orientation imaging system comprises at least one laser device arranged to lighten the corn kernel with a laser line, and a plurality of orientation imaging devices configured to acquire respective two-dimension orientation images of the corn kernel along different viewing directions, and wherein during the step of acquiring at least one orientation image of the corn kernel, the corn kernel is lightened with the laser line and two-dimension orientation images of the corn kernel along different viewing directions are acquired.

4. The method according to claim 1, wherein the step of identification of the kernel orientation is followed by identification of differences between structural features of the embryo and structural features of an endosperm of the kernel and sorting of the kernel according to said differences.

5. The method according to claim 1, wherein after the step of sorting the corn kernel as a function of the orientation, the method further comprises the steps of:

acquiring at least one image of the corn kernel with a coloration imaging system, the coloration imaging system having a modality adapted to enable coloration to be distinguished on the image, determining the coloration intensity of at least one of the embryo area and the non-embryo area on the acquired image, and sorting the corn kernel as a function of the coloration.

6. The method according to claim 5 especially adapted for sorting corn kernels according to ploidy level of the respective embryos, the corn kernels having a marker causing:

the embryo area having a dark coloration and the pericarp top area having a dark coloration for "diploid corn kernels", the embryo area having a bright coloration and the pericarp top area having a dark coloration for "haploid corn kernels", and the pericarp top area having a bright coloration for "yellow kernel", wherein the step of determining the coloration intensity comprises determining the coloration between bright coloration and dark coloration of at least one of the embryo area and the pericarp top area on the acquired coloration image.

7. The method according to claim 5, wherein the coloration imaging system includes a plurality of coloration imaging devices configured to acquire respective coloration images of the corn kernel along different acquiring directions, and wherein during the step of acquiring at least one coloration image of the corn kernel, at least one of the coloration imaging devices is selected in accordance with the orientation of the corn kernel.

8. The method according to claim 7, wherein the plurality of coloration imaging devices comprises at least one top coloration imaging device arranged to face the support surface, and at least one bottom coloration imaging device arranged below the support surface, and wherein during the step of acquiring at least one coloration image of the corn kernel, said at least one coloration image is chosen between a coloration image of the upper surface of the corn kernel acquired by the top coloration imaging device and a coloration image of the resting surface of the corn kernel acquired by the bottom coloration imaging device.

9. The method according to claim 8, wherein each of the corn kernels is conveyed on the support surface along a path in a conveying direction and dropped at an end of the path, and wherein the top and bottom coloration imaging devices are arranged respectively upstream and downstream with respect to the conveying direction, the bottom coloration imaging device being arranged to acquire said at least one coloration image as the corn kernel is dropped.

10. The method according to claim 8, wherein during the step of acquiring at least one coloration image of the corn kernel, at least one coloration image is acquired by the top coloration imaging device if the corn kernel is in one of the embryo position, the tip position and the inclined centered embryo position, and at least one coloration image is acquired by the bottom coloration imaging device if the corn kernel is in the back position.

11. The method according to claim 5, wherein the coloration imaging system comprises at least one pair of lightening and imaging assemblies, each lightening and imaging assembly comprising a multispectral camera arranged to acquire a coloration image of the corn kernel at a wavelength and a lightening device configured to lighten the corn kernel at the wavelength, and wherein during the step of acquiring at least one coloration image of the corn kernel, in each pair, one of the lightening and imaging assemblies lightens the corn kernel and acquires a coloration image of the corn kernel at a wavelength $\lambda 1$ comprised between 550 nm and 700 nm, preferably between 600 nm and 650 nm, and the other lightening and imaging assembly lightens the corn kernel and acquires a coloration image of the corn kernel at a wavelength $\lambda 2$ comprised between 700 nm and 850 nm, preferably between 720 nm and 780 nm.

12. The method according to claim 11, wherein the coloration imaging system comprises a plurality of pairs of lightening and imaging assemblies distributed around the support surface, and wherein during the step of acquiring at least one coloration image of the corn kernel, at least one of the pairs of lightening and imaging assemblies is selected.

13. The method according to claim 5, wherein the coloration imaging system comprises at least one laser device arranged to lighten the corn kernel with a laser line, and at least one scatter camera arranged to acquire a scatter coloration image of the corn kernel, and wherein during the step of acquiring at least one coloration image of the corn kernel, the corn kernel is lightened with the laser line and at least one scatter coloration image of the corn kernel is acquired.

* * * * *